United States Patent
Rolff et al.

(10) Patent No.: US 8,302,454 B2
(45) Date of Patent: Nov. 6, 2012

(54) METHOD FOR CALIBRATING A MASS SPECTROMETRIC SNIFFING LEAK DETECTOR

(75) Inventors: Norbert Rolff, Horrem (DE); Randolf Paul Rolff, Horrem (DE); Ludolf Gerdau, Elsdorf (DE)

(73) Assignee: Inficon GmbH, Cologne (DE)

( * ) Notice: Subject to any disclaimer, the term of this patent is extended or adjusted under 35 U.S.C. 154(b) by 375 days.

(21) Appl. No.: 11/922,038

(22) PCT Filed: Jun. 2, 2006

(86) PCT No.: PCT/EP2006/062891
§ 371 (c)(1),
(2), (4) Date: Sep. 3, 2009

(87) PCT Pub. No.: WO2006/136491
PCT Pub. Date: Dec. 28, 2006

(65) Prior Publication Data
US 2009/0314052 A1 Dec. 24, 2009

(30) Foreign Application Priority Data
Jun. 21, 2005 (DE) .......................... 10 2005 028 557

(51) Int. Cl.
*G01N 21/00* (2006.01)

(52) U.S. Cl. ........................................................ 73/1.06

(58) Field of Classification Search .................. None
See application file for complete search history.

(56) References Cited

U.S. PATENT DOCUMENTS

| 6,263,724 B1 | 7/2001 | Devance ........................ 73/40.7 |
| 6,617,411 B1 | 9/2003 | Friedrich ........................ 528/21 |
| 6,871,169 B1 | 3/2005 | Hazen et al. ..................... 703/2 |

FOREIGN PATENT DOCUMENTS

| AT | 397891 B | 7/1994 |
| DE | 10046039 A1 | 3/2002 |
| JP | 05217549 | 8/1993 |
| JP | 06222044 | 8/1994 |

OTHER PUBLICATIONS

Adam et al. "*Grundlagen der Vakuumtechnik*," Mar. 1997, p. 94-123.
International Search Report and Written Opinion dated Aug. 22, 2006 based on PCT application No. PCT/EP06/062891.
International Preliminary Report on Patentability for corresponding PCT application No. PCT/EP2006/062891 dated Jan. 24, 2008 (English translation).

*Primary Examiner* — Robert R Raevis
(74) *Attorney, Agent, or Firm* — Ohlandt, Greeley, Ruggiero & Perle, LLP

(57) ABSTRACT

Usually, a sniffing leak detector must be calibrated for each tracing gas. The calibration comprises ranging of the spectral positions into the mass spectrum and the amplitude height. At least one mass line is determined with a calibrating gas. The mass lines lying between two mass lines and/or between a zero point and a line are determined by interpolation and/or extrapolation. In this manner, a sniffing leak detector can be used for such tracing gases which have not previously been used for calibration purposes.

6 Claims, 1 Drawing Sheet

METHOD FOR CALIBRATING A MASS SPECTROMETRIC SNIFFING LEAK DETECTOR

BACKGROUND

1. Field of the Disclosure

The disclosure relates to a method for calibrating a spectrometric sniffing leak detector for various tracing gases to be detected, said method comprising using a defined calibration gas that preferably escapes through a test leak.

2. Discussion of the Background Art

Sniffing leak detectors are used for detecting a tracing gas escaping from a container to be tested for leaks. A typical field of application of sniffing leak detectors are refrigerators and air conditioners where a coolant is contained in a circuit sealed against the surroundings. During the quality control the tightness of the coolant circuit is to be checked. A sniffing leak detector takes in ambient air which is fed to a gas detector for determining whether a tracing gas is contained in the air taken in. Mere identification of the presence of a tracing gas is normally not sufficient. Further, information on the quantity of the escaping tracing gas and/or the size of the detected leak are required.

Sniffing leak detectors comprise a gas separation system as a gas detector, said gas separation system analyzing the gas mixture taken in. The gas separation system normally is a mass spectrometer. However, an infrared gas detector may also be used. The gas separation system determines the components contained in the gas mixture according to the mass number and the respective amplitude. The mass number indicates the molecular mass of the gas. Many gases comprise a combination of several peaks with different amplitudes.

There is a need for using a leak detector for detecting various tracing gases. Here, each tracing gas requires a separate calibration to be carried out. In U.S. Pat. No. 6,263,724 a gas analyzer comprising autocalibration means is described. A container comprising a calibrated test leak is filled with a mixture of n gases having different masses. The partial leakage flow of each of said n gases of the gas mixture is known. The mass number of each of said gases is determined. With the aid of such a calibrating method a calibration is carried out only for selected gases. If the leak detector is afterwards to be used for other gases, a new calibration using said tracing gas as calibrating gas is required.

SUMMARY OF THE DISCLOSURE

A method for calibrating a sniffing leak detector which allows a test for numerous tracing gases to be performed even when these tracing gases have not been used in the calibration process.

Accordingly, at least one spectrometric peak of the calibrating gas, whose leak rate and fraction distribution are known, is measured. Based on this measurement, a device factor is determined. On the basis of the known fraction factors of other gases and the determined device factor, the amplitude of these other gases can be determined.

The method according to the disclosure allows for calibration preferably with the aid of several spectrometric peaks which are produced by a calibrating gas or several calibrating gases and have defined spectral positions and amplitudes. Thus a larger range of the scale of the spectral axis and/or gases can be covered. The disclosure is based on the fact that, when a plurality of tracing gases are concerned, it is not necessary to carry out a calibration for each tracing gas involved. Rather, the calibration is performed using at least one selected calibration gas, wherein at least one spectrometric peak is generated. Since the spectral positions of the calibration gas are known, a scale of the spectral axis can be generated on the basis of the measured peaks or a measured peak and the zero point, in which scale the spectral positions of other gases can be integrated. In this manner, a calibrated spectral axis is produced for each sniffing leak detector and/or for each gas detector included therein, said spectral axis covering a larger range of spectral positions.

In addition to the identification of a gas, the quantity of this gas must be determined for obtaining information on the size of the detected leak. For this purpose, the amplitudes of the measured spectrometric peaks must be determined. According to the present disclosure, sensitivity factors for the amplitudes of the peaks of each tracing gas are determined from the measured amplitude values of the peaks of the calibrating gas and the known fraction distributions of the peaks of each tracing gas according to spectral position and respective amplitude portion. In this manner, the leak detector is not only calibrated with respect to the spectral position but also with respect to the respective amplitude values for the individual gases.

Between two spectrometric peaks measured during the calibration process the spectral positions can be determined by linear interpolation. It is possible to combine with each other pairs of peaks with known spectral positions, and to carry out a linear interpolation between the peaks of a pair. Outside the range included by the peaks of known gases, the spectral position can be determined by extrapolation. Here, a deviation of the spectral position determined at the last (outermost) peak is retained in the extrapolation range. Thus an error of 0.2 at one of the outermost peaks is carried forward as an additive error into the extrapolation range, for example.

According to the disclosure, a sniffing leak detector is calibrated for many gases in a single calibration process, wherein the sensitivity of the tracing gases not forming part of the calibrating gases is determined from known gas properties.

Besides the measurement of the peak positions of the calibrating gas, the spectral positions can be evaluated from gases contained in the air. For example, air contains a small portion of argon which as a distinct peak at a mass number of 40. In this manner, argon or any other gas contained in the air can also be used for producing a scale of the spectral positions. However, gases contained in the ambient air are not suitable for normalizing the amplitudes for the purpose of determining the leak size.

When a mass spectrometer is used, the mass axis is represented as a spectral axis (X axis). In an IR spectrometer the spectral axis indicates the wavelength.

BRIEF DESCRIPTION OF THE DRAWINGS

An embodiment of the disclosure will now be described in greater detail with reference to the drawings in which.

DETAILED DESCRIPTION OF THE PREFERRED EMBODIMENT

Figure 1:
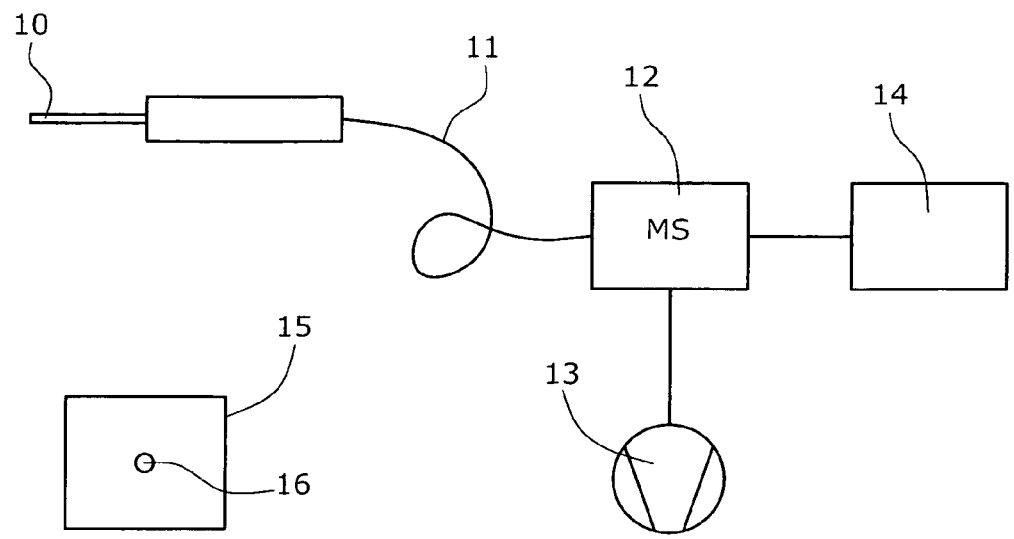
FIG. 1 shows a schematic block diagram of a sniffing leak detector.

The sniffing leak detector shown in FIG. 1 comprises a sniffing tip 10 through which gas is taken in. The sniffing tip 10, which can be guided by hand during the leak detecting process, is connected with a flexible sniffing conduit 11. The sniffing conduit 11 extends to a gas separation system 12 which is capable of selectively identifying gases taken in. The gas separation system 12 is a mass spectrometer MS, for example, but it may also be any other type of gas detector, such as an infrared gas detector. The gas separation system 12 is connected with a vacuum pump 13 which produces the vacuum required for operation of the mass spectrometer and feeds the gas taken in back into the surroundings. In an evaluation and display unit 14 the data supplied by the separation system 12 are evaluated and made accessible to the operator.

The sniffing leak detector serves for manual leak detection. It can be used in the manufacture of air conditioners or refrigerators which are filled with a gas, e.g. a coolant. The gas escaping at a leak is drawn off by the sniffing tip 10 and through the gas separation system. In some devices the gas separation system is arranged in the handle of the sniffing tip 10.

Various types of gas separation systems are available. Some of them are capable of separating the air from the additional substances contained therein, and further of distinguishing between the different gas portions of the leak gas. With the aid of a mass spectrometer the different coolants or other gases can be separately detected and displayed. So far the sensitivity has been determined separately for each gas.

For the purpose of calibrating the sniffing leak detector a container 15 is used which comprises a test leak 16 of known size. The sniffing tip 10 sniffs at the test leak 16 for determining the leak rate and for calibrating the display of the device to the test leak. A temperature sensor (not shown) determines the temperature of the calibrating gas. The leak rate is converted to a reference temperature of 20° C., for example.

Figure 2:
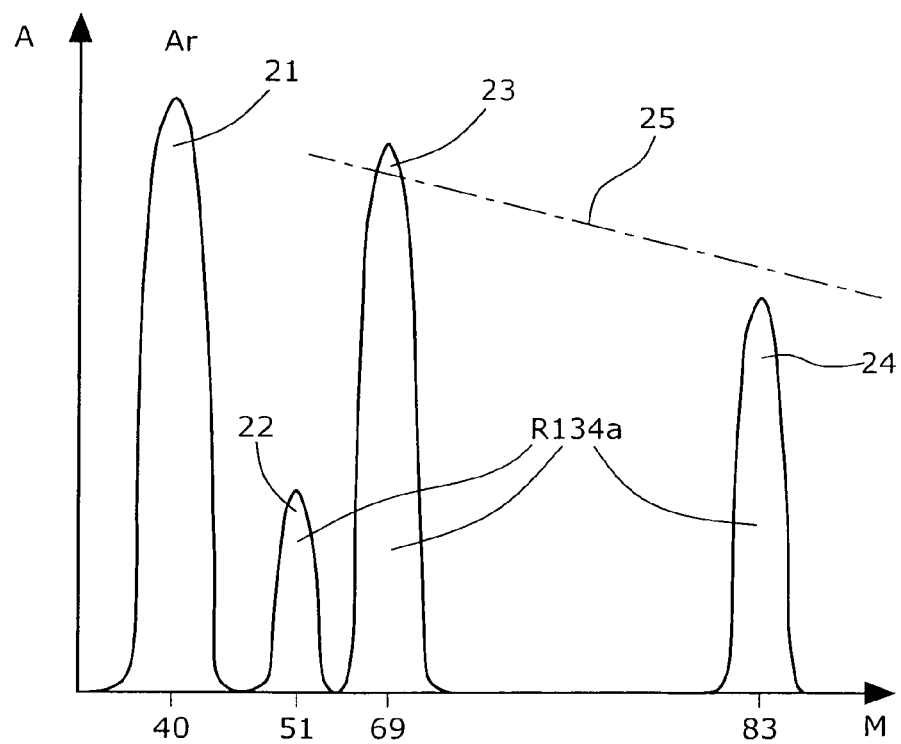
FIG. 2 shows an example of a mass spectrum with various peak positions of detected gases.

FIG. 2 shows a mass spectrum determined by the gas separation system 12. The shown mass spectrum is that of a calibrating gas. In the present case, the coolant R134a was selected as the calibrating gas.

In FIG. 2 the mass number M is plotted on the abscissa, and the amplitude A of the mass spectrometer is plotted on the ordinate. The calibrating gas produces several spectrometric peaks in the mass spectrum. Further, the gas mixture taken in contains air with all gas portions included therein.

In FIG. 2 a first spectrometric peak 21 occurs at a mass number of 40 in the mass spectrum. Said mass number corresponds to the gas argon (Ar). Said peak is produced by the argon portion contained in the air. Argon generates a distinct and stable peak and is therefore well suited for calibrating the mass scale, even if the calibrating gas does not include argon.

In the illustrated embodiment, the calibrating gas contained in the container 15 produces the three spectrometric peaks 22, 23 and 24. Peak 22 lies at a mass number of 51, peak 23 lies at a mass number of 69, and peak 24 lies at a mass number of 83. This corresponds to the characteristic of the gas R134a. Further, the gas has a characteristic fraction distribution of:

51/14%
69/72%
83/63%.

The first figure indicates the respective mass number M, and the second figure indicates the peak height relative to the maximum peak of the same gas. The fraction distribution thus supplies information on the mass numbers of the peaks concerned and the amplitude portions of the individual peaks.

According to the disclosure, the positions of the peaks of argon and the calibrating gas R134a which escapes through the test leak 16 are identified and used for determining the mass numbers 40, 69 and 83. Peak 22 is not evaluated because of its small height. Between the mass numbers 40 and 69 the mass numbers are determined by linear interpolation, and between the mass numbers 69 and 83 the mass numbers are also determined by linear interpolation. In this manner, a mass number scale is produced in which any detected gas can be ranged. The mass range above 83 can be extrapolated towards larger masses. For example, this can be effected by carrying forward the mass error detected at mass number 83, which mass error is added as a constant to the determined measured values above 83.

The calibration of the amplitude which depends from the size of the test leak 16 is carried out in the same manner as the calibration of the mass number scale. All stable gas lines of the calibration gas can be used for determining the sensitivity. However, in the example described above, peak 21 of argon is not suitable for this purpose since argon is contained in the air and not in the calibrating gas escaping through the test leak 16.

For calibrating the mass positions, it is not absolutely necessary to use a calibrating gas. The mass positions can also be determined by evaluating individual gases contained in the air. However, air contains only a few gases suitable for this purpose. For calibrating the amplitude scale, a test leak is definitely required.

The amplitudes are calibrated in that for the calibrating gas the error between the measured peaks relative to the fraction distribution is averaged. This is represented by straight line 25 in FIG. 2. Here, it is assumed that peak 23 was evaluated too high, and peak 24 was evaluated too low relative to the fraction distribution. Then the amplitudes are adjusted to each other on the straight line 25, wherein the amplitude value of peak 23 is reduced by the same value by which the amplitude value of peak 24 is increased. When calibrating the amplitudes to the size of the test leak, a larger range of mass numbers can be calibrated with at least one measured peak by determining sensitivity factors for the individual gases.

The leak rate Lr of a tracing gas which differs from the calibrating gas can be calculated according to the following equation:

$$Lr = GF \times BF \times IW \times MF \quad (1)$$

where
  Lr=leak rate
  GF=device factor
  BF=fraction factor (of the respective peak)
  IW=ionization probability
  MF=material factor The device factor depends on the respective leak detector. Said device factor indicates the sensitivity of the leak detector. It remains constant to a large extent for the various gases. The factors BF, IW and MF which depend on the type of gas used can be seen from a table. Such tables can be found under the following internet address, for example: http://www.inficongasanalyzers.com/pdf/Calculating_Partial_Pressures.pfd.

For the calibrating gas R134a (gas 1) of the present embodiment the following equation applies $$Lr_1 = GF \times BF_1 \times IW_1 \times MF_1 \quad (2)$$

where the subscript 1 respectively designates the gas 1.
From equation (2) the device factor can be obtained $$GF = \frac{Lr_1}{BF_1 \times IW_1 \times MF_1} \quad (3)$$

For a second gas (gas 2) the following equation applies $$Lr_2 = GF \times BF_2 \times IW_2 \times MF_2 \quad (4)$$

With the aid of this equation (4) and the known device factor GF from equation (3) all gases can now be converted to a known gas. For reducing the error rate caused by the differences between the various mass spectrometers, the gas ratios can also be checked by measurement.

What is claimed is:

1. A method for calibrating a spectrometric leak detector for different tracing gases to be detected, the method comprising:

using a defined calibration gas escaping through a test leak, said calibration gas having defined spectrometric peaks at defined mass numbers along a mass axis, each peak having an amplitude wherein the amplitudes of the peaks form a characteristic fraction distribution of the calibration gas, said fraction distribution having a maximum peak and indicating fraction factors of the peaks wherein, for each peak, a fraction factor comprises the amplitude of the peak relative to the amplitude of the maximum peak of the calibration gas, determining spectral positions of peaks of the tracing gases on the basis of known spectral positions of peaks of the tracing gas and spectral positions on the mass axis by interpolation and/or extrapolation of peaks of the calibrating gas and/or of a measured peak and a zero point along the mass axis, calibrating the measured amplitudes of the peaks of the calibration gas by averaging a deviation of the measured peak values with respect to the fraction distribution to obtain a correction factor, using the measured amplitude of at least one peak of the calibrating gas with a known leak rate for determining a device factor, and determining an amplitude of the tracing gas from the measured amplitudes of the peaks of the tracing gas and said device factor using the correction factor.

2. The method according to claim 1, wherein from the calibrating gas the spectral position of at least one defined peak is determined.

3. The method according to claim 1, wherein the zero point of the spectral position is used as a known fixed point.

4. The method according to claim 1, wherein between two measured peaks and/or between the zero point of the spectral axis and a measured peak the spectral positions are determined by linear interpolation.

5. The method according to claim 1, wherein in an extrapolation range lying outside the range of measured peaks the spectral positions are determined in that a deviation of the spectral position detected at the last peak is retained in the extrapolation range.

6. The method according to claim 1, wherein during measurement of the amplitudes of the peaks of the test leak an amplitude distribution deviating from the known fraction factors is corrected for the other gases to be measured by interpolation and/or extrapolation via the spectral axis.

* * * * *